US009961921B2

(12) United States Patent
Medoff

(10) Patent No.: US 9,961,921 B2
(45) Date of Patent: *May 8, 2018

(54) PRODUCING EDIBLE RESIDUES FROM ETHANOL PRODUCTION

(75) Inventor: Marshall Medoff, Brookline, MA (US)

(73) Assignee: Xyleco, Inc., Wakefield, MA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 13/440,107

(22) Filed: Apr. 5, 2012

(65) Prior Publication Data

US 2012/0282379 A1 Nov. 8, 2012

Related U.S. Application Data

(63) Continuation of application No. PCT/US2010/052382, filed on Oct. 12, 2010.

(60) Provisional application No. 61/251,610, filed on Oct. 14, 2009.

(51) Int. Cl.
*A23K 10/30* (2016.01)
*A23L 5/30* (2016.01)
*C08H 8/00* (2010.01)
*A23K 10/38* (2016.01)

(52) U.S. Cl.
CPC .............. *A23K 10/38* (2016.05); *A23K 10/30* (2016.05); *A23L 5/30* (2016.08); *C08H 8/00* (2013.01); *Y02E 50/16* (2013.01); *Y02E 50/17* (2013.01); *Y02P 60/873* (2015.11)

(58) Field of Classification Search
CPC ......... Y02E 50/16; Y02E 50/17; A23K 10/38; A23K 10/30; Y02P 60/873; C08H 8/00; A23L 5/30
See application file for complete search history.

(56) References Cited

U.S. PATENT DOCUMENTS

| | | | |
|---|---|---|---|
| 5,196,069 A | 3/1993 | Cullingford et al. | |
| 6,379,723 B1 | 4/2002 | Samuelsson | |
| 6,555,350 B2 * | 4/2003 | Ahring et al. | 435/162 |
| 7,846,295 B1 * | 12/2010 | Medoff | 162/50 |
| 7,867,359 B2 * | 1/2011 | Medoff | 162/50 |
| 7,900,857 B2 * | 3/2011 | Medoff | 241/23 |
| 7,932,065 B2 * | 4/2011 | Medoff | 435/165 |
| 7,935,219 B2 * | 5/2011 | Medoff | 162/50 |
| 8,052,838 B2 * | 11/2011 | Medoff | 162/50 |
| 8,070,912 B2 * | 12/2011 | Medoff | 162/50 |
| 8,142,620 B2 * | 3/2012 | Medoff | 204/157.63 |
| 8,147,655 B2 * | 4/2012 | Medoff | 204/157.63 |
| 8,168,038 B2 * | 5/2012 | Medoff | 162/50 |
| 8,212,087 B2 * | 7/2012 | Medoff | 568/878 |
| 8,221,585 B2 * | 7/2012 | Medoff | 162/50 |
| 8,277,607 B2 * | 10/2012 | Medoff | 162/50 |
| 8,716,537 B2 * | 5/2014 | Medoff | 568/878 |
| 2006/0088922 A1 * | 4/2006 | Yang et al. | 435/161 |
| 2006/0251764 A1 | 11/2006 | Abbas et al. | |
| 2006/0286628 A1 | 12/2006 | Everett et al. | |
| 2007/0037259 A1 | 2/2007 | Hennessey et al. | |
| 2007/0161095 A1 | 7/2007 | Gurin | |
| 2009/0029432 A1 | 1/2009 | Abbas et al. | |
| 2009/0071066 A1 | 3/2009 | Meier | |
| 2009/0104157 A1 | 4/2009 | Solomon et al. | |

FOREIGN PATENT DOCUMENTS

| | | | | |
|---|---|---|---|---|
| CA | 2823043 | | 6/2008 | |
| GB | 880456 | | 10/1961 | |
| JP | 63133997 | A * | 6/1988 | |
| JP | 2001029438 | A * | 2/2001 | |
| JP | 2002228536 | A * | 8/2002 | |
| RU | 2176889 | C2 * | 12/2001 | ............. A23K 40/00 |
| WO | 2006-017137 | A1 | 2/2006 | |
| WO | 2008/073186 | | 6/2008 | |
| WO | WO-2011/046967 | A1 | 4/2011 | |

OTHER PUBLICATIONS

Stepanik T, Kost D, Nowicki T, Gaba D. "Effects of Electron Beam Irradiation on Deoxynivalenol Levels in Distillers Dried Grain and Solubles and in Production Intermediates" Food Additives and Contaminants, Sep. 2007 (published online Aug. 8, 2007), 24(9), pp. 1001-1006 (PubMed Abstract only, 2 pages).*
Narendranath, N.V. "Bacterial Contamination and Control in Ethanol Production" The Alcohol Text Book, 4th Ed., 2003, Chapter 20, pp. 287-298.*
Kume, T and Matsuda, T "Changes in Structural and Antigenic Properties of Proteins by Radiation" Radiat. Phys. Chem., 1995, 46(2), pp. 225-231.*
Taherzadeh, M.J. and Karimi, K. "Pretreatment of Lignocellulosic Wastes to Improve Ethanol and Biogas Production: a Review," International Journal of Molecular Sciences, Sep. 1, 2008, 9,(9), pp. 1621-1651.*
Kamakura, M and Kaetsu, I "Radiation Degradation and the Subsequent Enzymatic Hydrolysis of Waste Papers," Biotechnology and Bioengineering, 1982, 24(4), pp. 991-997.*
Ralha, A. N. C.; Gerpe, M. Comenge; Ruiz, A. Santos "Influence of the oligoelements on respiration during germination of Triticum monococcum" Anales bromatol. (Madrid),1955, 7, pp. 67-80 (CAS Abstract only).*
Herzallah, S et al "Aflatoxin Decontamination of Artificially Contaminated Feeds by Sunlight, γ-Radiation, and Microwave Heating" J. Appl. Poult. Res. 2008,17,pp. 515-521.*
O'Bien, Chris "Grains of Possibility: Ways to Use Spent Brewing Grains" American Brewer, 2007 (Spring), 11 pages.*
FDA "Ionizing Radiation for the Treatment of Food" 21 CFR §179.26, 2012,pp. 457-459.*
FDA "Ionizing Radiation for the Treatment of Food" 21 CFR §179.26, 2004, pp. 442-443.*
E-Beam Services "E-Beam" ebeamservices.com, archived Oct. 8, 2007, 6 pages.*

(Continued)

*Primary Examiner* — Christopher R Tate
*Assistant Examiner* — Aaron J Kosar
(74) *Attorney, Agent, or Firm* — Wilmer Cutler Pickering Hale and Dorr LLP

(57) ABSTRACT

Edible residues of ethanol production, e.g., distillers grains and solubles, are produced that are low in, or substantially free from, antibiotic residues. Antibiotics or bacteria present in edible residues resulting from ethanol production are inactivated by irradiating the edible residues.

14 Claims, 1 Drawing Sheet

(56) References Cited

OTHER PUBLICATIONS

Cao, et al., "Ethanol Production From Corn Cob Pretreated by the Ammonia Steeping Process Usng Genetically Engineering Yeast," Biotechnology Letters, vol. 18, No. 9 (Sep. 1996) pp. 1013-1018.
Gulati, et al. "Assessment of Ethanol Production Options for Corn Products," Bioresource Technology 58 (1996), 253-264.
Jan Olgierd Dziegielewski, "γ-Radiation Decomposition Yields in Dehydrated and Hydrated Aminobenzl-Penicillin, and Basic Radiation Chemical Processes," Int. J. Radiat. Phys. Chem. 1975, v. 7, c.507-518.
Mosier, "Cellulosic Ethanol-Biofuel Beyond Corn", Purdue Agriculture, Dec. 2006, pp. 1-4.
Eurasian Search Report for corresponding application 201270548, dated May 9, 2012, 4 pages.
ISR for corresponding application PCT/US10/52382, dated Dec. 14, 2010, 5 pages.
Written Opinion for corresponding application PCT/US10/52382, dated Dec. 14, 2010, 4 pages.
Stepanik T., Kost D., Nowicki T., Gaba D. "Effects of Electron Beam Irradiation on Deoxynivalenol Levels in Distillers Dried Grain and Solubles and in Production Intermediates" Food Additives and Contaminants, Sep. 2007 (published online Aug. 8, 2007), 24(9), pp. 1001-1006.
Thiele-Brun, S., and Dirk Peters, "Photodegradation of pharmaceutical antibiotics on slurry and soil surfaces" Landbauforschung Volkenrode 1, Mar. 31, 2007,57,pp. 13-23.
Kwon, Joong-Ho, "Current status of Food Irradiation in Korea" (2007), Accessed at http://foodirra.jaea.go.jp/dbdocs/006001003064.pdf (Jun. 17, 2014), pp. 35-42.
Corresponding NZ Application No. 612228, Examination report dated Jun. 17, 2014, 2 pages.
Corresponding SG Application No. 2012024568, Written Opinion dated Jun. 9, 2014, 19 pages.
Bonvehi J. et al., "Evaluation of y-Irradiation in Cocoa Husk", J. Agric. Food Chem., 2000, vol. 48, pp. 2489-2494.
European Search Report—Corresponding European Application No. 10823967.4, dated Aug. 6, 2015, 9 pages.
Smith, G.S., et al., Irradiation enhancement of biomass conversion, Radiat. Phys. Chem., 1985, vol. 25, 27-33.
Japanese office action—Corresponding JP application No. 2012-534297—dated Sep. 7, 2015, 2 pages.
Office Action—Ukraine Application No. 201205718, dated Jan. 6, 2016, 4 pages.
Israeli Office Action issued by the Israeli Patent Office for Israeli Application No. 251159 dated Jul. 20, 2017 (3 pages).
Zheng et al., "Overview of biomass pretreatment for cellulosic ethanol production," International Journal of Agricultural and Biological Engineering 2(3), pp. 51-68 (Sep. 30, 2009).
Search Report for Eurasian Patent Application No. 201790746 dated Sep. 27, 2017 (6 pages including translation).

\* cited by examiner

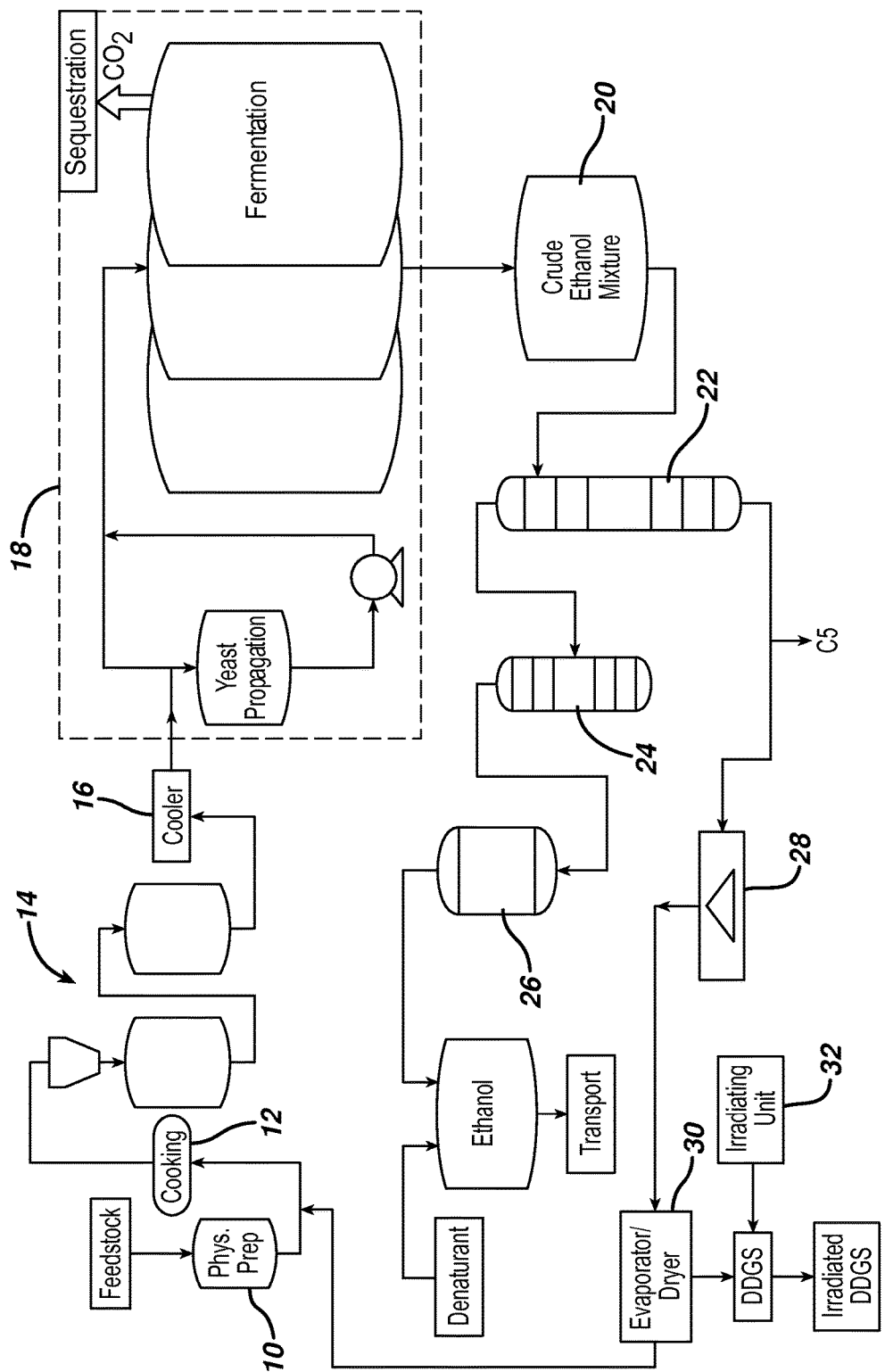

PRODUCING EDIBLE RESIDUES FROM ETHANOL PRODUCTION

RELATED APPLICATIONS

This application is a continuation of International Serial No. PCT/US2010/052382, filed Oct. 12, 2010, which claims priority of U.S. Provisional Application Ser. No. 61/251,610, filed on Oct. 14, 2009. The entirety of each of these applications is incorporated herein by reference.

TECHNICAL FIELD

This invention relates to producing edible residues from ethanol production, e.g., distillers grains and residues from cellulosic ethanol production.

BACKGROUND

Manufacturing plants exist for the production of ethanol from grains, e.g., corn, and from sugars. Ethanol manufacturing is discussed in many sources, e.g., in The Alcohol Textbook, $4^{th}$ Ed., ed. K. A. Jacques, et al., Nottingham University Press, 2003. Distillers grains (also referred to as distillers grains and solubles (DGS) or dry distillers grains (DDGS)) are a by-product of ethanol production. Distillers grains are a valuable by-product, as they are a major source of low-cost livestock feed. However, recently concerns have arisen due to the presence of antibiotics in distillers grains. The antibiotics in the distillers grains are generally present as a result of the use of antibiotics in the ethanol manufacturing process. Antibiotics such as penicillin and virginiamycin are used to control bacteria that compete with yeast during fermentation, converting sugar into lactic acid rather than ethanol. If restrictions on the sale or use of distillers grains are imposed due to concerns over antibiotic content, this will further damage the profit margins of ethanol producers, as well as depriving livestock farmers of a good source of livestock feed.

U.S. Patent Application No. 20060127999, "Process for producing ethanol from corn dry milling," and U.S. Patent Application No. 20030077771, "Process for producing ethanol," are each incorporated by reference herein in their entireties. In addition, U.S. Pat. No. 7,351,559 "Process for producing ethanol," U.S. Pat. No. 7,074,603, "Process for producing ethanol from corn dry milling" and U.S. Pat. No. 6,509,180, "Process for producing ethanol" are each incorporated by reference herein in their entireties.

SUMMARY

Generally, this invention relates to edible residues from ethanol production, and to methods of producing edible residues that are low in antibiotic content, or, in preferred embodiments, substantially free of antibiotics. By "low in antibiotic content," or "substantially free of antibiotics," we mean that the edible residue contains little or no active antibiotic, e.g., less than 100 ppm; the edible residue may contain inactivated antibiotics, as will be discussed herein.

The edible residue may be, for example, distillers dry grains (DDG), in the case of corn ethanol production, or a mixture of lignin, unfermented sugars (e.g., xylose, arabinose), minerals (e.g., clay, silica, silicates), and in some cases undigested cellulose.

In some implementations, the edible residue contains less than 50 ppm by weight active antibiotic, e.g., less than 25 ppm, less than 10 ppm, or even less than 1 ppm.

In one aspect, the invention features a method comprising irradiating edible residues that have been produced as a by-product of an ethanol manufacturing process.

Some implementations include one or more of the following features. The edible residues comprise distillers grains and solubles, e.g., from a corn ethanol process. Alternatively, the edible residues may comprise lignin, xylose and minerals, and in some cases undigested cellulose, for example when the ethanol manufacturing process utilizes a cellulosic feedstock and/or a lignocellulosic feedstock.

In some cases, the edible residues contain an antibiotic, and irradiating is performed under conditions that are selected to inactivate or destroy the antibiotic, e.g., by changing the molecular structure of the antibiotic. In such cases, after irradiation the edible residues can contain less than 100 ppm, such as less than 50, 25, 10, or 1 ppm, by weight of active antibiotic, or can be substantially free of active antibiotic. In some implementations, prior to irradiation the edible residues contain from about 500 ppm to about 10,000 ppm by weight of active antibiotic.

In other cases, the ethanol manufacturing process may be conducted without addition of antibiotics. In such cases, prior to irradiation the edible residues may contain bacteria, and irradiation is performed under conditions that destroy bacteria.

In some implementations, irradiation is delivered at a dose of greater than about 0.5 MRad, and/or less than about 5 Mrad, e.g., at a dose of from about 1 to about 3 Mrad.

If the edible residues are distillers grains and solubles, the distillers grains and solubles may be dried, producing dried distillers grains and solubles (DDGS). Drying may be performed prior to, during or after irradiation.

All publications, patent applications, patents, and other references mentioned herein or attached hereto are incorporated by reference in their entirety for all that they contain.

DESCRIPTION OF THE DRAWINGS

FIG. 1 is a schematic diagram illustrating a process for making ethanol and distillers grains.

DETAILED DESCRIPTION

Referring to FIG. 1, a plant for manufacturing ethanol can include, for example, one or more operating units (10) for receiving and physically treating a feedstock, which in a typical grain-based (e.g., corn or grain) ethanol plant generally includes grain receiving equipment and a hammermill. If the feedstock to be used is a non-grain cellulosic or lignocellulosic material the operating units 10 may be configured to reduce the size of the feedstock in a manner that exposes internal fibers of the feedstock, e.g., as disclosed in U.S. Pat. No. 7,470,463, the full disclosure of which is incorporated herein by reference.

In some cases, for instance if the feedstock includes a material that is difficult to treat by fermentation, e.g., crop residues or other lignocellulosic feedstocks, the plant may include an optional operating unit configured to treat the feedstock to reduce its recalcitrance. In some implementations, recalcitrance is reduced by at least 5%, or at least 10, 15, 20, 25, 30, 35, 40, 45, 50, 55, 60, 65, 70, 75, 80, 85, 90, or 95%. In some cases recalcitrance is substantially completely eliminated. Treatment processes utilized by the recalcitrance reducing operating unit can include one or more of irradiation, sonication, oxidation, pyrolysis, and steam explosion. Treatment methods can be used in combinations of two, three, four, or even all of these technologies (in any order). Operating units that pretreat feedstocks to reduce recalcitrance are described in WO 2008/073186, the full disclosure of which is incorporated herein by reference.

The feedstock can then be processed in a series of cooking devices (12), as is well known, subjected to liquefaction (14), and cooled (16) to a suitable temperature for contact with microorganisms such as yeasts. The cooled stream then flows to a bio-processing system (18) where it is bio-processed, e.g., fermented, to produce a crude ethanol mixture which flows into a holding tank (20).

The bio-processing system may in some cases utilize antibiotics to prevent excessive generation of lactic acid by bacteria in the mixture. For example, antibiotic may be added in a concentration of from about 500 ppm to about 10,000 ppm by weight of the feedstock.

Alternatively, the use of antibiotics may be avoided, for example by cleaning the feedstock and processing equipment, running the process at low pH levels, and maintaining high throughput during steeping, mashing and fermentation. Non-antibiotic additives may also be used, for example the hop extract sold by BetaTec Hop Products under the tradename IsoStab™. If these alternatives are used, it is desirable to sterilize the edible residues of the process, to ensure their safety.

Water or other solvent, and other non-ethanol components, are stripped from the crude ethanol mixture using a stripping column (22), and the ethanol is then distilled using a distillation unit (24), e.g., a rectifier. Finally, the ethanol can be dried using a molecular sieve (26), denatured if necessary, and output to a desired shipping method.

Another stream comes off of the bottom of stripping column (22) and is passed through a centrifuge (28). A liquid fraction, or "thin stillage (backset)" is then returned to the process, generally prior to the cooking devices (12). The solids ("wet cake") are subjected to further processing, including drying, in an evaporator/dryer operating unit (30), resulting in the production of an edible residue, e.g., dried Distillers Grains and Solubles (DDGS) if the feedstock was corn.

The edible residue is then irradiated, using an irradiating unit (32). Irradiation serves both to inactivate any antibiotic present in the edible residue from the fermentation process, e.g., by changing the molecular structure of the antibiotic, and to sterilize the edible residue, killing any undesirable bacteria or other microorganisms present in the edible residue.

Irradiation can be performed using any suitable device. If the edible residue is in the form of a thin section, e.g., small pellets, electron beam irradiation may be preferred to provide high throughput. If deeper penetration is required, e.g., if the edible residue is in the form of a thick cake, gamma radiation can be used.

The radiation may be delivered in any dose that is sufficient to inactivate the antibiotic and/or destroy bacteria and undesirable microorganisms, without deleteriously affecting the nutrient availability of the edible residue. For example, the dose may be from about 0.5 MRad to about 5 MRad, e.g., about 1 MRad to about 3 MRad.

Drying of the edible residue may be performed before (as shown), during, or after irradiation, or may be omitted if desired.

Generally, all of the processing equipment used in the process described above is typically utilized in existing ethanol manufacturing plants, with the exception of optional recalcitrance reducing operating unit and the device used to irradiate the edible residue.

In some cases, the feedstock can be a cellulosic or lignocellulosic material that has been physically treated and optionally pre-treated at a remote location and then shipped to the plant, e.g., by rail, truck, ship (e.g., barge or supertanker), or air. In such cases, the material may be shipped in a densified state for volume efficiency. For example, the feedstock can be physically treated, e.g., using the size reduction techniques described below, to a bulk density of less than about 0.35 g/cc, and then densified to have a bulk density of at least about 0.5 g/cc. In some implementations, the densified material can have a bulk density of at least 0.6, 0.7, 0.8, or 0.85 g/cc. Fibrous materials can be densified using any suitable process, e.g., as disclosed in WO 2008/073186.

The feedstock can in some cases be fibrous in nature. Fiber sources include cellulosic fiber sources, including paper and paper products (e.g., polycoated paper and Kraft paper), and lignocellulosic fiber sources, including wood, and wood-related materials, e.g., particle board. Other suitable fiber sources include natural fiber sources, e.g., grasses, rice hulls, bagasse, cotton, jute, hemp, flax, bamboo, sisal, abaca, straw, corn cobs, rice hulls, coconut hair; fiber sources high in α-cellulose content, e.g., cotton. Fiber sources can be obtained from virgin scrap textile materials, e.g., remnants, post consumer waste, e.g., rags. When paper products are used as fiber sources, they can be virgin materials, e.g., scrap virgin materials, or they can be post-consumer waste. Aside from virgin raw materials, post-consumer, industrial (e.g., offal), and processing waste (e.g., effluent from paper processing) can also be used as fiber sources. Also, the fiber source can be obtained or derived from human (e.g., sewage), animal or plant wastes. Additional fiber sources have been described in U.S. Pat. Nos. 6,448,307, 6,258,876, 6,207,729, 5,973,035 and 5,952,105.

The sugars liberated during bioprocessing can be converted into a variety of products, such as alcohols or organic acids. The product obtained depends upon the microorganism utilized and the conditions under which the bio-processing occurs. These steps can be performed utilizing the existing equipment of the grain-based ethanol manufacturing facility, with little or no modification. A xylose (C5) stream may be produced during bio-processing, if hemicellulose is present in the feedstock, and thus in some cases provision is made for removing this stream after the stripping column.

The microorganism utilized in bioprocessing can be a natural microorganism or an engineered microorganism. For example, the microorganism can be a bacterium, e.g., a cellulolytic bacterium, a fungus, e.g., a yeast, a plant or a protist, e.g., an algae, a protozoa or a fungus-like protist, e.g., a slime mold. When the organisms are compatible, mixtures of organisms can be utilized. The microorganism can be an aerobe or an anaerobe. The microorganism can be a homofermentative microorganism (produces a single or a substantially single end product). The microorganism can be a homoacetogenic microorganism, a homolactic microorganism, a propionic acid bacterium, a butyric acid bacterium, a succinic acid bacterium or a 3-hydroxypropionic acid bacterium. The microorganism can be of a genus selected from the group *Clostridium, Lactobacillus, Moorella, Thermoanaerobacter, Proprionibacterium, Propionispera, Anaerobiospirillum,* and *Bacteriodes*. In specific instances, the microorganism can be *Clostridium formicoaceticum, Clostridium butyricum, Moorella thermoacetica, Thermoanaerobacter kivui, Lactobacillus delbrukii, Propionibacterium acidipropionici, Propionispera arboris, Anaerobiospirillum succinicproducens, Bacteriodes amylo-*

*philus* or *Bacteriodes ruminicola*. For example, the microorganism can be a recombinant microorganism engineered to produce a desired product, such as a recombinant *Escherichia coli* transformed with one or more genes capable of encoding proteins that direct the production of the desired product is used (see, e.g., U.S. Pat. No. 6,852,517, issued Feb. 8, 2005).

Bacteria that can ferment biomass to ethanol and other products include, e.g., *Zymomonas mobilis* and *Clostridium thermocellum* (Philippidis, 1996, supra). Leschine et al. (International Journal of Systematic and Evolutionary Microbiology 2002, 52, 1155-1160) isolated an anaerobic, mesophilic, cellulolytic bacterium from forest soil, *Clostridium phytofermentans* sp. nov., which converts cellulose to ethanol.

Bio-processing, e.g., fermentation, of biomass to ethanol and other products may be carried out using certain types of thermophilic or genetically engineered microorganisms, such *Thermoanaerobacter* species, including *T. mathranii*, and yeast species such as *Pichia* species. An example of a strain of *T. mathranii* is A3M4 described in Sonne-Hansen et al. (*Applied Microbiology and Biotechnology* 1993, 38, 537-541) or Ahring et al. (*Arch. Microbiol.* 1997, 168, 114-119).

To aid in the breakdown of the materials that include the cellulose (treated by any method described herein or even untreated), one or more enzymes, e.g., a cellulolytic enzyme can be utilized. In some embodiments, the materials that include the cellulose are first treated with the enzyme, e.g., by combining the material and the enzyme in an aqueous solution. This material can then be combined with any microorganism described herein. In other embodiments, the materials that include the cellulose, the one or more enzymes and the microorganism are combined concurrently, e.g., by combining in an aqueous solution.

The carboxylic acid groups in these products generally lower the pH of the fermentation solution, tending to inhibit fermentation with some microorganisms, such as *Pichia stipitis*. Accordingly, it is in some cases desirable to add base and/or a buffer, before or during fermentation, to bring up the pH of the solution. For example, sodium hydroxide or lime can be added to the fermentation medium to elevate the pH of the medium to range that is optimum for the microorganism utilized.

Fermentation is generally conducted in an aqueous growth medium, which can contain a nitrogen source or other nutrient source, e.g., urea, along with vitamins and trace minerals and metals. It is generally preferable that the growth medium be sterile, or at least have a low microbial load, e.g., bacterial count. Sterilization of the growth medium may be accomplished in any desired manner. However, in preferred implementations, sterilization is accomplished by irradiating the growth medium or the individual components of the growth medium prior to mixing. The dosage of radiation is generally as low as possible while still obtaining adequate results, in order to minimize energy consumption and resulting cost. For example, in many instances, the growth medium itself or components of the growth medium can be treated with a radiation dose of less than 5 Mrad, such as less than 4, 3, 2 or 1 Mrad. In specific instances, the growth medium is treated with a dose of between about 1 and 3 Mrad.

OTHER EMBODIMENTS

A number of embodiments have been described. Nevertheless, it will be understood that various modifications may be made without departing from the spirit and scope of the disclosure.

For example, while the production of dried distillers grains and solubles (DDGS) is discussed above, in some cases the end product may instead be wet distillers grains and solubles (WDGS). While WDGS, with its high moisture content, is generally expensive to transport and subject to spoilage, in some cases it may be used, for instance where the livestock feed is to be used close to the ethanol manufacturing facility. Such applications are described, for example, in U.S. Pat. No. 6,355,456, the full disclosure of which is incorporated herein by reference.

Either wet-milling or dry-milling processes may be used in the methods disclosed herein.

Accordingly, other embodiments are within the scope of the following claims.

What is claimed is:

1. A method of producing irradiated edible residues, the method comprising:
   irradiating a feedstock comprising a cellulosic and/or lignocellulosic material with a dose of electron beam radiation sufficient to reduce the recalcitrance of the material;
   bioprocessing the irradiated feedstock using a cellulolytic enzyme, wherein bioprocessing produces a sugar and edible residues; and
   drying the edible residues and irradiating the edible residues with electron beam radiation, wherein the edible residues contain an antibiotic and the step of irradiating the edible residues is performed under conditions selected to inactivate or destroy the antibiotic.

2. The method of claim 1 wherein the bioprocessing comprises fermentation.

3. The method of claim 2 wherein the edible residues comprise distillers grains and solubles (DGS).

4. The method of claim 3 wherein the distillers grains and solubles have been dried, producing dried distillers grains and solubles (DDGS).

5. The method of claim 4 wherein drying is performed prior to irradiation of the edible residues.

6. The method of claim 1 wherein, after irradiation, the edible residues contain less than 100 ppm by weight of active antibiotic.

7. The method of claim 6 wherein, after irradiation, the edible residues are substantially free of active antibiotic.

8. The method of claim 1 wherein, prior to irradiation, the edible residues contain about 500 ppm to about 10,000 ppm by weight of active antibiotic.

9. The method of claim 1 wherein, prior to irradiation, the edible residues contain bacteria, and the irradiating of the edible residues is performed under conditions that destroy the bacteria.

10. The method of claim 9 wherein the bioprocessing is conducted without addition of antibiotics.

11. The method of claim 1, wherein irradiation of the edible residues is delivered at a dose of greater than about 0.5 Mrad.

12. The method of claim 1, wherein irradiation of the edible residues is delivered at a dose of less than about 5 Mrad.

13. The method of claim 1, wherein irradiation of the edible residues is delivered at a dose of from about 1 to about 3 Mrad.

14. The method of claim 1 wherein the dose is sufficient to reduce the recalcitrance by at least 25%.

* * * * *